Dec. 15, 1931.   R. E. EAVES   1,836,110
COMBINED GLARE PREVENTER AND WINDSHIELD WIPER FOR AUTOMOBILES
Filed Oct. 1, 1928
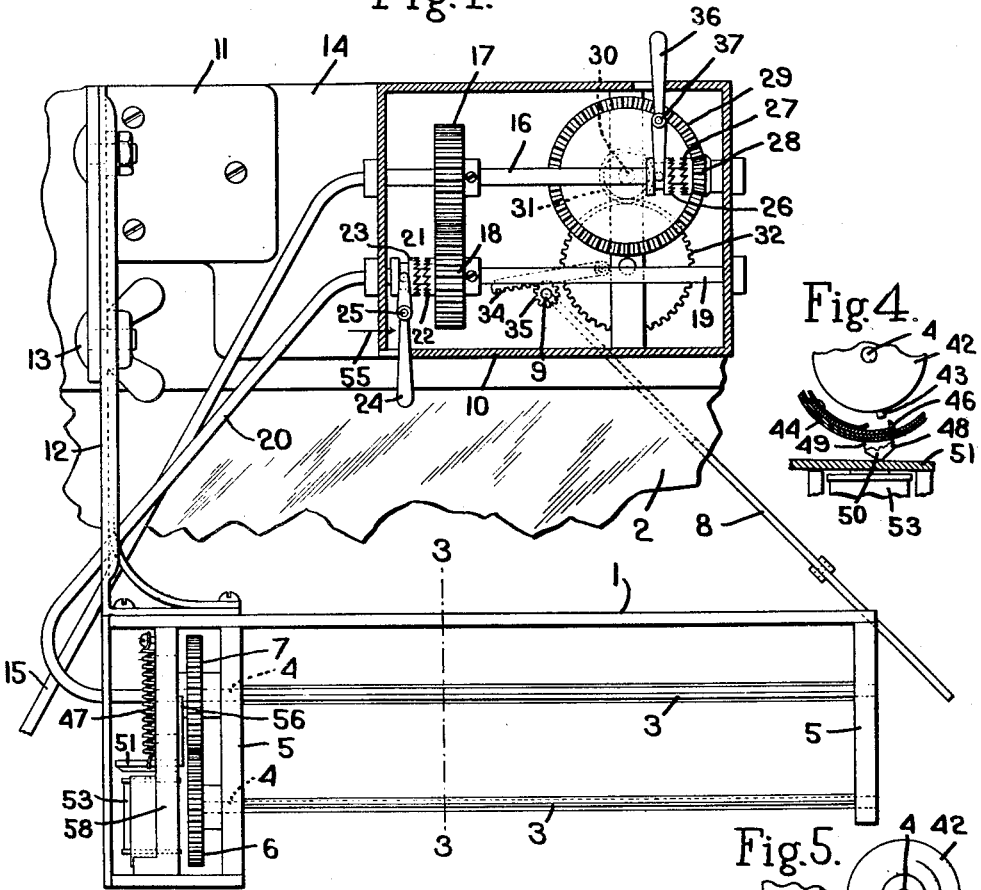
Inventor.
Ralph E. Eaves.
by Heard Smith & Tennant
Attys.

Patented Dec. 15, 1931

1,836,110

UNITED STATES PATENT OFFICE

RALPH E. EAVES, OF BOSTON, MASSACHUSETTS

COMBINED GLARE PREVENTER AND WINDSHIELD WIPER FOR AUTOMOBILES

Application filed October 1, 1928. Serial No. 309,520.

This invention relates to a combined glare preventer and windshield wiper for automobiles and has for one of its objects to provide a device by which both the glare of the headlights from oncoming automobiles may be eliminated and the windshield may be kept clean.

The glare eliminator feature of the invention operates on the principle of the glare eliminator illustrated in United States Patent No. 1,631,022, dated May 31, 1927, and it comprises a plurality of blades rotatable about axes at right angles to the line of vision and operating by their rotation to cut down or reduce the amount of light which is transmitted to the eyes of the automobile driver.

This glare eliminator is situated on the inside of the windshield and when it operates the rotation of the blades will create an air current which is directed against the windshield glass. Situated on the outside of the windshield is a vibrating wiping blade which serves to clean the outside of the glass. The air current delivered by the rotating blades against the inside of the glass will tend to prevent the glass from fogging or steaming up on the inside as frequently happens under certain atmospheric conditions and the wiping blade on the outside keeps the outer face of the windshield clean so that the combined action of the two will produce a clean windshield under all circumstances.

Furthermore, the combined action of the rotating blades and the wiping blade will be of great value in preventing the windshield glass from becoming coated with ice during a sleet storm, especially in the case of a closed car. In a closed car the air inside is usually considerably warmer than that on the outside and in a sleet storm where there is a tendency for ice to form on the windshield the warmer inside air which is directed against the inside of the glass by the rotating blades will help to prevent freezing or frosting of the windshield and this, in conjunction with the operation of the wiping blade, will keep the windshield clean and free from frost.

The glare preventer and windshield wiper are mechanically connected so that they may be operated in unison from the same source of power, the apparatus being constructed so that either the glare eliminator or the windshield wiper may be operated separately if so desired.

In a glare preventer of this type it is desirable that the blades come to rest in a horizontal position so as not to interfere with the vision and another feature of my invention relates to novel means for bringing the blades to rest at the time that the power is cut off.

In order to give an understanding of my invention I have illustrated in the drawings a selected embodiment thereof which will now be described after which the novel features will be pointed out in the appended claims.

Fig. 1 is a view illustrating the combined windshield wiper and glare preventer, showing it as it would be applied to an automobile;

Fig. 2 is an end view of the glare preventer illustrating the means employed for bringing it to rest in a predetermined position;

Fig. 3 is a section on the line 3—3, Fig. 1;

Fig. 4 is a fragmentary view showing the position of the parts when the glare preventer is in operation;

Fig. 5 is a fragmentary view illustrating the part of the stop motion for the glare preventer;

Fig. 6 is a section on the line 6—6, Fig. 2.

As stated above the glare preventer unit is constructed somewhat like that illustrated in United States Patent No. 1,631,022, dated May 31st, 1927. It comprises a frame 1 adapted to be supported inside the car and adjacent the windshield 2 and in which is journalled two or more blades or shutters 3. These blades are mounted to rotate about parallel horizontal axes and the frame 1 is so placed on the automobile that it will stand in the line of vision between the driver of the automobile and the headlights of an oncoming automobile.

When the blades 3 are rapidly rotated they cut down the amount of light from the headlights which is received by the driver of the car and thus eliminate the glare without in any way changing the character of the light or affecting one's judgment of distance as is done where colored glare preventers are used.

The blades 3 are shown as secured to shafts 4 which are journalled at their ends in bearing members 5 forming part of the frame. The shafts 4 are geared together through suitable gears 6 and 7, one of which is on one shaft 4 and the other of which is mounted on the other shaft. One of the blades is positively driven from a suitable source of power, as will be presently described, the construction being such that the blades may be operated at will.

The windshield wiper is in the form of the usual wiping blade 8 which is pivotally mounted at 9 to the portion 10 of the frame which supports the glare preventer. The portion 10 of the frame is shown in the form of a housing which is carried by a bracket 11 and the glare preventer frame 1 has a vertical member 12 secured thereto which is adjustably connected to the bracket 11 so as to permit the glare preventer to be raised or lowered as desired. The glare preventer frame is held in its adjusted position by means of a clamping screw 13.

The bracket 11 will be secured to the body 14 of the automobile directly above the windshield 2 and in such a position that the glare eliminator will be in the line of vision between the driver of the automobile and the headlights of an oncoming automobile.

The windshield wiper 8 is operated from the same source of power as the blades of the glare eliminator and means are provided whereby these devices can be operated either simultaneously and independently.

I propose to operate both devices from a motor which is mounted in any suitable position on the automobile and from which extends a flexible driving shaft 15. This shaft 15 is connected to a rigid shaft 16 that is journalled in the frame portion 10. Said shaft has fast thereon a gear 17 which meshes with and drives another gear 18 loose on a countershaft 19 also journalled in the frame portion 10 and this countershaft 19 is connected to one of the shafts 4 through a flexible driving shaft 20.

A suitable clutch device 21 is employed for clutching the gear 18 to the shaft 19. This clutch device comprises a clutch member 22 fast to the gear 18 and another clutch member 23 splined to the shaft 19. The clutch member 23 is adapted to be operated by a clutch lever 24 pivoted to the frame 10 at 25.

Whenever it is desired to operate the glare eliminator the occupant of the automobile will set the shaft 15 in operation and actuate the clutch lever 24 to throw the clutch 21 into engagement and when this is done the glare eliminator will be driven from the shaft 15 through the gears 18, 19 and flexible shaft 20.

The windshield wiper 8 is arranged to be actuated from the shaft 16. For this purpose said shaft has a clutch thereon comprising a movable clutch member 26 that is splined to the shaft and a second clutch member 27 loose on the shaft and having rigid therewith a bevelled gear 28. This bevelled gear 28 meshes with a larger bevelled gear 29 pivoted at 30 in the frame portion 10. The bevelled gear 30 has a smaller spur gear 31 rigid therewith which meshes with and drives another gear 32 also journalled in the frame. This gear 32 is provided on one face with a crank pin to which is connected a rack bar 34 that meshes with a pinion 35 rigid with the shaft 9 of the windshield wiper. As the gear 32 rotates the pinion 35 will be turned first in one direction and then the other thereby swinging the windshield wiper from the full to the dotted line position thus giving it the desired wiping movement.

The movable clutch member 26 is adapted to be actuated by an operating lever 36 which is pivotally mounted at 37 to the frame 10. When it is desired to operate the windshield wiper the occupant of the car will throw the clutch 26, 27 into engagement thereby causing the wiper blade 8 to be vibrated back and forth and to wipe the glass 2 of the windshield.

As stated above the flexible shaft 15 is intended to be connected to and operated by a suitable motor placed in any desirable position on the automobile. I will preferably use an electric motor for this purpose which is shown in Fig. 2 diagrammatically at 38. This motor is operated through a motor circuit 39 which is connected to the battery 40 forming part of the lighting and ignition system of the automobile.

41 indicates a switch which will be placed in some suitable location, as for instance on the steering wheel or steering column of the automobile or perhaps on the instrument board and by which the motor circuit 39 may be opened and closed. When the motor circuit is closed by the switch 41 the motor will be set in operation thereby rotating the shaft 15 and either the glare preventer or the windshield wiper may then be operated by proper manipulation of the clutch levers 24, 36.

If conditions are such that it is desired to use the glare eliminator intermittently for short periods of time, as might occur if a car equipped with the glare eliminator was being driven at night along a road where automobiles were continually moving in the opposite direction, then the operator might close the clutch 21 and leave it closed and then operate the glare eliminator by closing and opening the switch 41. In the same way the windshield wiper could be intermittently actuated.

In a glare eliminator of this type it is highly desirable that when the device comes to rest the blades 3 should be maintained in a substantially horizontal position so that they will offer no appreciable obstruction to the view of the driver of the car.

One of the features of my invention relates to a novel means for ensuring that these blades will thus be brought to rest in a horizontal position.

The gear 7 is shown as having integral therewith a disk or drum member 42 which is provided with a stop pin 43. Encircling this drum 42 is a band 44 of flexible spring material which is arranged in spiral form so that it contains one or more turns which encircle the drum 42, the outer end of the band being rigidly connected to the frame 1 as shown at 45. The inner end of the band is provided with a lip 46 which co-operates with the stop pin 43 in bringing the drum 42 and thereby the blades 3 to rest. Normally when the glare eliminator is idle or at rest the lip 46 will be engaging the pin 43.

When the glare eliminator is to be set into operation the inner end of the band 44 containing the lip 46 is disengaged from the pin 43 thereby freeing the drum 42 and allowing it to be rotated from the motor when the clutch 21 is thrown into engagement. The position of the inner end of the band 46 is controlled partly by a spring 47 which tends to hold the lip 46 in its operative position shown in Fig. 2 and partly by the resiliency of the band 44 which tends to move the inner end of the band upwardly and thereby disengage the lip from the pin 43. The inner end of the band 44 has a U-shaped member 48 rigid therewith, the arms 49, 50 of said member 48 being directed outwardly and embracing the turns of the band 44.

This member 48 is adapted to engage a swinging controlling member 51 which is pivoted to the frame 1 at 52 and is acted upon by the spring 47, the latter being a pulling spring which is connected at one end to the controlling member 51 and at the other end to the frame 1. The spring 47 tends to hold the member 51 in the elevated position shown in Fig. 2 and said member 51 by engagement with the U-shaped member 48 holds the inner end of the band 44 elevated with the lip 46 in the path of movement of the pin 43.

When the glare eliminator is to be started in operation the control member 51 is moved downwardly against the action of the spring 47 and when this occurs the resiliency of the band 44 will cause the inner end thereof to swing outwardly, and thus disengage the lip 46 from the pin 43 as shown in Fig. 4. The control member 51 is herein shown as being controlled by a magnet 53 which is carried by the frame 1, the member 51 functioning as the armature of the magnet. So long as the magnet is deenergized the spring 47 will hold the control member 15 in the elevated position but when the magnet is energized it will draw the armature 51 downwardly as shown in Fig. 4 thus permitting the resiliency of the band 44 to free the lip 46 from the pin 43.

I have provided herein means whereby the magnet will be energized when the clutch 21 is thrown into engagement. For this purpose the coils of the magnet 53 are in a circuit 54 connected to the battery 40 and having therein a contact 55 which is closed by a swinging movement of the clutch lever 24. If the battery 40 is grounded on the automobile frame, as is the usual custom, the contact 55 may be situated to be directly engaged by the lever 24 as it is operated thereby closing the shunt circuit.

In order to operate the glare preventer, therefore, it will be necessary to close the switch 41 to set the motor in operation and then to actuate the clutch lever 24. The operation of the clutch lever will throw the clutch 21 into engagement and will simultaneously close the circuit 54 for the magnet 53 thereby causing the disengagement of the lip 46 from the pin 43 and freeing the glare preventer so that it can be freely rotated.

The band 44 and drum member 42 constitute a stop motion for bringing the glare eliminator to rest in the position shown in Fig. 3 when the circuit 54 is opened by a movement of the lever 24 which will disengage the clutch 21.

It will be remembered that while the clutch 21 is engaged the shunt circuit 54 will be closed so that the magnet will be energized and the armature 51 will be held in its lowered position shown in Fig. 4. With the parts in this position the lip 46 is out of the path of movement of the pin 43. As soon as the circuit 54 is opened by a movement of the lever 24 which will disengage the clutch 21 the magnet 53 will become de-energized and the spring 47 will raise the control member 51 into its elevated position. During the upward movement of the control member it acts on the U-shaped member 48 and thus lifts the inner end of the band 44 upwardly or toward the center and in so doing it brings the lip 46 into the path of movement of the pin 43.

When during the rotation of the drum 42 said pin 43 engages the lip 46 the momentum of the parts will cause the spring band 44 to be wound up as indicated by dotted lines in Fig. 2. This winding up movement which carries the inner end of the band 44 counter clockwise in Fig. 2 will cause the inner turn of the band to be wound onto the periphery of the drum 42 as shown by dotted lines Fig. 2 thereby applying a friction brake to the drum and bringing it to rest. When the tension of the spring member 44 has overcome the momentum of the blades and has brought them to rest then said spring which is partially wound up will tend to unwind and in doing so the inner end thereof will move from the dotted line position Fig. 2 to the full line position and will thereby turn the blades backwardly slightly. The parts will finally come to rest in the full line position Fig. 2 with the U-shaped member 44 resting against the control member 51 which is then held in raised position by the spring 47.

The parts are so arranged that when the drum 42 is in the position shown in Fig. 2 the blades 3 will be in a substantially horizontal position shown in Fig. 3, in which position they will offer practically no obstruction to the vision of the driver of the car.

In order to ensure that the lip 42 will not become accidentally disengaged from the pin 43 as the winding up movement of the spring 44 is begun I have provided a guard cam member 56 having a cam face 57. This member is situated on the inner face of the supporting wall 58 of the frame 1 and is adapted to be engaged by the side 49 of the member 48.

Said guard member is best shown in Fig. 5 which shows the parts in the position they assume just as the stop pin 43 engages the lip 46.

The rotation of the drum 42 in the direction of the arrow Fig. 5 will carry the inner end of the band 44 to the left upwardly looking at said Fig. 5, and during this movement the leg or side 49 of the member 48 will engage and ride up the cam face 57, the latter operating to hold the inner end of the spring in its inward position thus preventing any possibility that the lip 46 will become disengaged from the pin 43.

This device provides a cushion means to bring the blades to rest invariably in a horizontal position shown in Fig. 3, which means is positive but easy in its action.

The frame 1 is herein shown as a U-shaped frame, it having the two ends 5 connected by a cross bar at the top. The advantage of this construction is that there is no portion of the frame situated below the blades to form an obstruction to the vision.

The rotation of the blades creates an air current which is directed against the glass of the windshield. This is highly advantageous under those conditions in which the windshield glass tends to fog up on the interior or to freeze up on the exterior. The movement of the air created by the blades tends to prevent the fogging action and this, together with the wiping action of the wiper constitutes a combination by which the portion of the windshield through which the driver looks will be kept clean.

Moreover, when driving in a sleet storm or under conditions where the windshield tends to freeze up on the outside the current of air delivered by the blades against the inside of the glass, which air is warmer than the outside air and usually considerably above freezing temperature, will keep the glass of the windshield sufficiently warm to prevent ice forming on the outside of the windshield faster than the wiper blade will remove it. These two devices thus co-operate to produce a clean windshield under varying weather conditions.

I claim.

1. In a glare eliminator, the combination with a blade rotatable about an axis extending substantially at right angles to the line of vision of the user, a driving element by which the blade is rotated, a clutch for connecting the blade to or disconnecting it from the driving element, and a device to bring the blade to rest in a position substantially parallel to the line of vision, said device being inactive while the clutch is operative but becoming operative when the clutch is disconnected.

2. In a glare eliminator, the combination with a blade rotatable about an axis extending substantially at right angles to the line of vision of the user, a driving element by which the blade is rotated, a clutch for connecting the blade to or disconnecting it from the driving element, means operative when the clutch is disconnected to apply a retarding action to the blade and to bring it to rest in a predetermined position said means being inactive when the clutch is operative.

3. In a glare eliminator, the combination with a blade rotatable about an axis extending at substantially right angles to the line of vision of the user, of a driving element for rotating said blade, a clutch for connecting the driving element to the blade, a brake drum rigid with the blade carrying a stop pin, a resilient brake element encircling said drum and provided with a lip engageable with the stop pin when the clutch is disengaged, the engagement of the stop pin with the lip tightening the brake element about the drum and thereby bringing the blade to rest.

4. In a glare eliminator, the combination with a blade rotatable about an axis at right angles to the line of vision of the user, a brake drum rigid with the blade and provided with a stop pin, means to operatively connect the blade to and disconnect it from a driving element, a resilient band encircling the drum and provided with means adapted to engage said pin, the resiliency of the band normally holding the lip in position to be engaged by said pin, means to withdraw the lip from engagement with the pin when the blade is operatively connected to the driving member thereby permitting the blade to rotate freely, said band being re-engageable with the stop pin when the blade is disconnected from the driving element.

5. In a glare eliminator, the combination with a blade arranged to rotate about an axis extending transversely to the line of vision of the user, of a disk rigid with the blade, a resilient band encircling the disk and anchored at its outer end, means normally coupling the inner end of the band to the disk, means for rendering the blade either operative or inoperative, and means to disconnect the band from the disk when the blade is set in operation, said band automatically re-engaging the disk again when the blade is rendered inoperative and thereby bringing the blade to rest.

6. In a glare eliminator, the combination with a blade rotatable about an axis extending at right angles to the line of vision of the user, a disk rigid with the blade and provided with a stop pin, a resilient band encircling the disk and anchored at its outer end, said band having at its inner end a lip which is normally held in engagement with the stop pin by the resiliency of the band.

7. In a device of the class described, the combination with a supporting frame adapted to be attached to an automobile adjacent the windshield and comprising two frame sections adjustably connected together and situated one above the other, a vibrating wiping element for wiping the windshield carried by the upper frame section outside of the windshield, rotary blades mounted in the lower section and situated relatively close to the windshield on the inside thereof and in the line of vision of the driver of the automobile, a driving member, and means for operatively connecting said driving member both to the rotating blades and to the wiping element, the rotation of the blades serving to create an air current which is directed against the inside face of the portion of the windshield which is acted on by the wiper, whereby in cold weather the current of warmer air within the car which is directed against the inside of the windshield will warm sufficiently the portion of the windshield acted on by the windshield wiper to prevent ice forming thereon.

In testimony whereof, I have signed my name to this specification.

RALPH E. EAVES.